United States Patent [19]

Kniess et al.

[11] Patent Number: 5,790,526
[45] Date of Patent: *Aug. 4, 1998

[54] BI-DIRECTIONAL SIGNAL TRANSMISSION SYSTEM AND ADAPTER FOR SUCH A SYSTEM

[75] Inventors: Herbert J. Kniess, San Jose; Anthony S. Aguilar, Santa Cruz, both of Calif.

[73] Assignee: Philips Electronics North America Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 327,123

[22] Filed: Oct. 21, 1994

Related U.S. Application Data

[63] Continuation of Ser. No. 692,415, Apr. 29, 1991, abandoned.

[51] Int. Cl.[6] .................................................. H04L 25/20
[52] U.S. Cl. .......................... 370/257; 375/211; 178/71.1
[58] Field of Search ............................. 178/71 R, 71 N, 178/10 TS, 71.1; 375/36, 3, 4, 211, 214, 257, 258; 370/26, 273, 274; 455/15; 330/260, 291

[56] References Cited

U.S. PATENT DOCUMENTS

| | | | |
|---|---|---|---|
| 3,832,489 | 8/1974 | Krishna | 178/71 R |
| 4,012,593 | 3/1977 | Yamaguchi | 178/71 R |
| 4,436,961 | 3/1984 | Heilig | 179/77 |
| 4,476,352 | 10/1984 | Gerritsen et al. | 179/81 R |
| 4,524,327 | 6/1985 | Masuda et al. | 330/260 |
| 4,667,166 | 5/1987 | Itoh | 330/260 |
| 4,726,034 | 2/1988 | Schillhof et al. | 375/3 |

FOREIGN PATENT DOCUMENTS

| | | |
|---|---|---|
| 0171125 | 12/1986 | European Pat. Off. |
| 60-142059 | 5/1985 | Japan . |
| 2154831 | 9/1985 | United Kingdom . |
| 2189116 | 10/1987 | United Kingdom . |

OTHER PUBLICATIONS

Search Report.
Philips Data Handbook IC12a. "I²C-bus compatible ICs, Types MAB84X1 family to PCF8579", 1989, pp. 31–53.
Signetics Microcontroller User's Guide, 1989, pp. I-4 –I-7.

*Primary Examiner*—Chau Nguyen
*Attorney, Agent, or Firm*—Steven R. Biren

[57] ABSTRACT

A bi-directional signal transmission system comprises a bi-directional signal path with a low-impedance section coupled to a high-impedance section through a signal coupling for transmission of a binary signal in both directions; and adapting means for adapting the signal coupling under control of the signal itself, dependent on the transmission direction. I²C-bus systems in particular benefit from the presence of the adapting means since communicating stations now can be located farther apart than was practical previously. In addition, the driving capability of the transmitting station is no longer a limiting factor.

6 Claims, 3 Drawing Sheets

BI-DIRECTIONAL SIGNAL TRANSMISSION SYSTEM AND ADAPTER FOR SUCH A SYSTEM

This is a continuation of application Ser. No. 07/692,415, filed Apr. 29, 1991 now abandoned.

FIELD OF THE INVENTION

This invention relates to a bi-directional signal transmission system, comprising a bi-directional signal path with a low-impedance section coupled to a high-impedance section, for transmission of a binary signal in both directions. The invention further relates to an adapter for such a system.

BACKGROUND ART

An example of such a system is the well-known $I^2C$-bus system, disclosed in, for instance, Philips Data Handbook IC12a, "$I^2C$-bus compatible ICs, Types MAB84X1 family to PCF8579", 1989, pp. 31–53 which is hereby incorporated by reference. The $I^2C$-bus system is a serial bus system with stations (integrated circuits, ICs) that are interconnected through a bi-directional two-wire transmission channel, one wire for a binary data signal, and another for a binary clock signal, and that communicate according to a predetermined protocol. Dependent on its particular function within the system, each station can operate as transmitter or receiver, or both.

The data wire as well as the clock wire are connected to a positive supply voltage through pull-up resistors. The wires are floating high when the stations do not communicate. The stations' output stages have interfaces to the bus with an open-collector or an open-drain to perform the required wired-AND connection of all interfaces to the $I^2C$-bus.

The channel's impedance, i.e., the pull-up resistors, and the transmitting station's current sinking capability both determine the highest frequency usable and the longest distance possible between the transmitting station and a receiving station. The channel's parasitic capacitance becomes larger with increasing distance. Consequently, since the capacitance and the channel's impedance determine the rise time and fall time of the signal, the maximum transmission frequency drops. Reducing the channel's impedance would in itself allow higher frequencies. However, the transmitting station's limited and standardized current sinking capability would have to drain a larger current from the now smaller pull-up resistor, offsetting the advantage of the channel's reduced impedance. Therefore, the maximum transmission frequency for the $I^2C$-bus system is about 100 kHz at 3 mA, whereas the maximum distance between the stations should not be much greater than about 4 meters. In addition, owing to the limited output current, the driving capability of the transmitting station (fan-out) is restricted.

Another example of such system is a microprocessor device communicating with an integrated memory device over bi-directional interconnections through a buffer, a multiplexer or another routing device. See, for instance, Signetics Microcontroller User's Guide, 1989, pp. I-4–I-7. The operation of the routing device with regard to the direction of the data flow usually is controlled by the microprocessor. To this end, the microprocessor supplies a read-command or write-command to the routing device. This arrangement requires additional I/O pins, control circuitry and interconnections for controlling the routing device.

OBJECTS OF THE INVENTION

As indicated above, the prior art systems are afflicted with disadvantages that restrict the field of application with respect to the maximum communication distance, to the maximum driving capability or to the minimum number of I/O pins required. It is therefore an object of the invention to provide a bi-directional transmission system of the kind mentioned in the preamble, wherein the distance between communicating stations can be considerably greater than in the prior art. It is a further object of the invention to provide such a transmission system wherein the driving capability of the transmitting station is no longer a limiting factor. It is a still further object to provide means for widely extending the application of single-wire, bi-directional bus systems, such as the $I^2C$-bus system. It is still a further object to provide adapting means to adapt conventional circuitry in order to perform in accordance with these objects. It is another object of the invention to reduce the number of interconnections and I/O pins that constitute the communication channels between integrated circuit devices.

SUMMARY OF THE INVENTION

To this end, the invention provides a bi-directional signal transmission system that comprises a bi-directional signal path with a low-impedance section coupled to a high-impedance section for transmission of a binary signal in both directions. The system has an adapting means for adapting the signal coupling between the sections under control of the signal itself and dependent on the direction of the transmission.

The signal's transmission direction is either from the high-impedance section to the low-impedance section, or from the low-impedance section to the high-impedance section. The principle of the invention basically lies in realizing that the transmission from the high- to low-impedance section is the limiting factor in the communication, and that adapting the signal coupling in bi-directional use should therefore be under the control of the transmission direction. Upon arrival of the signal at the coupling between the sections, the adapting means senses the propagation direction and thereupon modifies the signal coupling. This architecture needs only local adapting means, i.e., located between the sections, as distinct from prior art adapting means that are controlled by additional control signals, for instance, the read/write command discussed above. The latter option would require ancillary control parts and control connections, increasing the number of parts needed and the cost.

The high-impedance section comprises, for instance, an output impedance of a station capable of at least transmitting binary signals, and the low-impedance section comprises a channel impedance of the bi-directional transmission channel.

In an embodiment according to the invention, the adapting means comprises a detectors for detecting the direction of transmission and a buffer connected to the transmission channel. The buffer is controllable by the detector. Upon detection of a particular direction of the transmission, the buffer is controlled to operate substantially synchronously with the signal. In the case of a transmission in the other direction, the adapting means may be substantially transparent to the signal.

In a further embodiment of a system in accordance with the invention, for transmission of an electrical signal, the detector comprises a sensing element located between the sections. The system further comprises a sensor for, upon sensing the polarity of a current through the element, supplying a control signal, indicative of the sensed polarity, to control the buffer.

The sensor may comprise a differential amplifier for sensing the polarity of the voltage across the sensing element. Preferably, linear-range means are provided for keeping the amplifier in its linear range. Its amplification characteristic is steepest in that particular region. Consequently, the amplifier's output signal is most sensitive to input voltage changes within the linear range.

The sensor element may comprise, for instance, a resistive element, a pair of diodes arranged in a mutually anti-parallel manner between the sections, or any other device, active circuit or passive circuit for generating a voltage difference upon sensing a current flowing through the sensing element.

In case the adapting means is partially or entirely incorporated in an integrated circuit, the diode arrangement in particular may contribute to the saving of substrate area. The diodes may be of the Schottky-type which may be advantageous in view of their low threshold voltage of 0.2 volts. The voltage drop across the sensing element preferably matches the input signal operating range of the differential amplifier. The other alternatives of the sensing element may be integrated as well, together with the buffer and the sensor.

The buffer includes, for instance, a controllable current source coupled to a node between the sensing element and the low impedance section. The current source has a control input coupled to an amplifier's output so that it is controlled substantially synchronously with the transmitting circuit.

The current source may include a main current path of a bipolar transistor coupled between the channel and a reference voltage. As is known, bipolar transistors have steeper control-voltage/current characteristics than field effect transistors, and drain more current. Therefore, a bipolar transistor gives rise to faster operation. Alternatively, the current source may comprise a field effect transistor. When the voltage across its main current path is reduced, its current driving capability is affected less than that of a bipolar transistor that would be driven into saturation. A field effect transistor would be able to fully charge or discharge the current source's load, whatever the case may be.

In addition, the current source may comprise a compound device, such as a Darlington transistor configuration or another current-amplifying configuration to gain speed.

Preferably, stabilizing means are provided for avoiding oscillations in the frequency range of interest for the signal transmission. The stabilizing means may, for instance, include at least one capacitive element between one of the amplifier's inputs and the amplifier's output for accomplishing phase-shifting. Alternatively, the stabilizing means may comprise a non-linear element, such as a diode, in a feedback path of the amplifier. In case the sensing element uses the anti-parallel diode arrangement, additional stabilizing means may not be needed since diodes are non-linear devices.

Preferably, the linear-range means includes an additional resistive element coupling the inverter's non-inverting input and the amplifier's inverting input through the sensing element. This prevents the amplifier from entering the flat range in its amplification characteristic. In case the current source comprises a bipolar transistor, the additional resistive element also keeps the transistor away from saturation.

Preferably, biasing means are provided for biasing the amplifier's output signal at a predetermined voltage level when the system is in a quiescent state. This is used to keep the current source, e.g., the bipolar transistor, just below its switching threshold. Consequently, less time is needed for triggering the current source into its active state.

A plurality of adapting means according to the invention, arranged in cascade at intervals along a signal path, permits still longer distances between communicating stations.

Note that the embodiments that are presented here are not limited to the I$^2$C-bus system. They may also be used in other bus systems that use bi-directional one-wire interconnections. Experiments on the I$^2$C-bus system at 100 kHz have indicated that inter-station distances can be on the order of magnitude of 100 meters and more when the system is equipped with adapting means in accordance with the invention, while still permitting acceptable communication.

Note also that a separately available adapting means, preferably as an integrated circuit, renders existing bus systems more versatile. The adaption is made only locally and does not require modifications in the conventional circuitry itself.

BRIEF DESCRIPTION OF THE DRAWING

The invention will be explained in further detail by way of example and with reference to the accompanying drawing in which.

DETAILED DESCRIPTION OF THE DRAWING

First System Example

Figure 1:
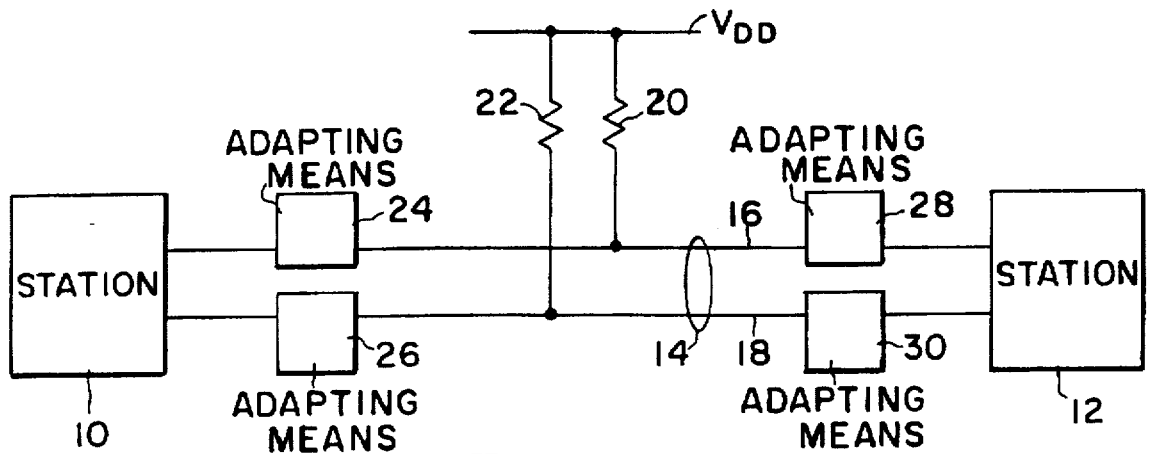
FIG. 1 shows a first example of a system with adapting means in accordance with the invention.

FIG. 1 shows a first example of a system with adapting means in accordance with the invention. Shown is an I$^2$C-system with two stations, 10 and 12, that communicate through a bi-directional, two-wire bus 14. Bus 14 includes a data wire 16 for data signal transport and a clock wire 18 for clock signal transport. The data signal and the clock signal both are binary signals.

Each of the bus wires 16 and 18 are pulled up to the supply voltage $V_{DD}$ through pull-up resistors 20 and 22, respectively, in the absence of communication. Communication between stations 10 and 12 is accomplished by pulling the wires low according to a predetermined protocol. Data is transferred from one station to the other under clock control of the transmitting station.

I$^2$C-circuit devices 10 and 12 comply with the I$^2$C-standards. This implies, among other things, a limited current sinking capability of about 3 mA at 100 kHz for the transmitting station to pull a wire low. This restricts the operating range of such a device to about 4 meters since the bus' internal capacitance and pull-up resistors 20 and 22 limit the signal's rise time and fall time. Lowering the value of pull-up resistors 20 and 22 would result in a larger load to be driven by devices 10 and 12, or, in other words, a smaller net current sinking capability.

To overcome that problem, adapting means 24, 26, 28, and 30 are introduced between each station, 10 and 12, and the wires 16 and 18, i.e. between the high impedance section and the low impedance section of the bi-directional wires 16, 18. When, for instance, station 10 starts transmitting, either over data wire 16 or clock wire 18, the relevant adapting means 24 or 26 modifies the bus' impedance as seen from station 10 upon detection of the signal propagating into bus 14. When station 10 is receiving a signal over wire 16 or 18 from station 12, adapting means 24 or 26 does not interfere with the communication and is substantially transparent.

Transmission is confirmed either through a separate control connection (not shown) between the transmitting station and the associated adapting means, or under control of the transmitted signal itself. The latter alternative is preferred when the number of interconnections and I/O pins of the stations and the adapting means are to be kept at a minimum. More importantly, adaptivity under signal control permits the use of standard I²C-devices.

Second System Example

Figure 2A:
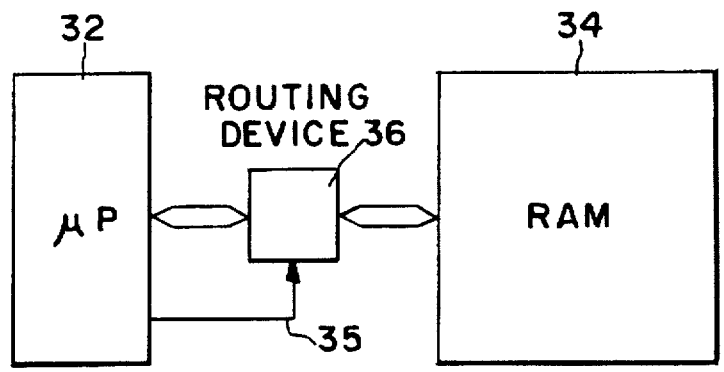
FIGS. 2a and 2b show a prior art system and a second example of a system with adapting means in accordance with the invention.
Figure 2B:
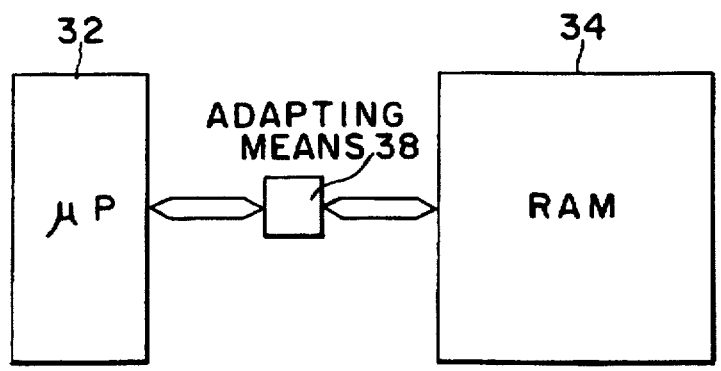

FIGS. 2a and 2b show a prior art system and a second example of a system according to the invention, respectively.

FIG. 2a shows an example of a prior art system, comprising integrated microprocessor circuit 32 communicating with integrated memory circuit 34 through routing device 36 over a bi-directional bus. See, for instance, Signetics Microcontroller User's Guide, 1989, pp. I-4–I-7, mentioned above. Routing device 36 is, for instance, a multiplexer, or a bi-directional buffer. The operation of routing device 36 is controlled by microprocessor 32 by means of control connection 35. An example of such buffer is an anti-parallel arrangement of two amplifiers, each with three-state outputs. The amplifiers are activated alternately, for instance, through the read/write command that is supplied to the buffers via control connection 35, depending on the direction of the data flow.

FIG. 2b shows a second example of a system in accordance with the invention with a microprocessor 32 and memory circuit 34 communicating over a bi-directional bus through an adapting means 38. Under the data signal (or address signal) control the adapting means amplifies the signal. This architecture does not need the additional control connection. Moreover, microprocessor 32 has one I/O pin less than the one in FIG. 2a, which reduces cost and control circuitry.

BASIC CONCEPT OF ADAPTING MEANS

Figure 3A:
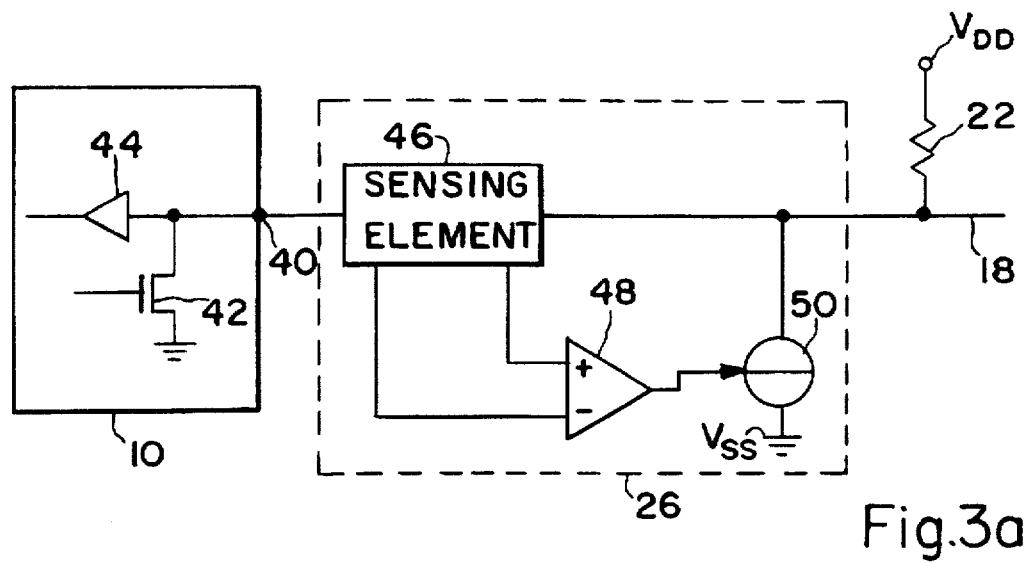
FIGS. 3a, 3b, 3c and 3d show the basic circuit of an adapting means in accordance with the invention.

FIG. 3a shows the basic idea of a circuit suitable for use as an adapting means, for instance, adapting means 26 of FIG. 1. The same will apply to adapting means 24, 28, 30 in FIG. 1 and adapting means 38 in FIG. 2b. Station 10 includes I/O terminal 40 for receiving and transmitting a binary signal. Internally, terminal 40 is connected to a first pull-down-switch element, i.e. pull-down transistor 42, used for transmitting, and input buffer 44, used for receiving. Inherent to the I²C-bus system is the wired-AND connection of the pull-down transistors. For further detail, reference is made to the above Philips Data Handbooks on I²C-bus compatible ICs.

Adapting means 26 includes a sensing element 46 coupled between the high impedance section and the low impedance section of the bi-directional signal path, a differential amplifier 48 whose inputs are connected across sensing element 46, and a second pull-down element, i.e., pull-down current source 50 connected between another supply voltage $V_{ss}$ and wire 18 of the low impedance section. Current source 50 is controlled by the output of amplifier 48. The adapting means 26 adapts the signal coupling between the high impedance section to its left in FIG. 3a and the low impedance section to its right.

Figure 3B:
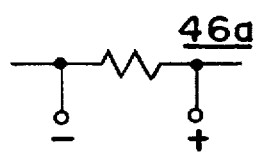
Figure 3C:
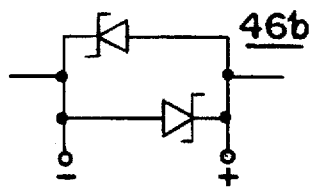
Figure 3D:
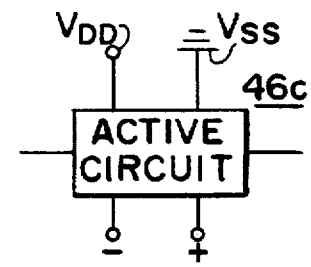

Sensing element 46 may comprise, for instance, a resistive element 46a (FIG. 3b), an anti-parallel arrangement of a pair of diodes 46b (FIG. 3c), or any active circuit 46c (FIG. 3d) that upon sensing a current flowing into it, generates a voltage difference between the inputs of amplifier 48. Connections to amplifier 48 of elements 46a, 46b and 46c are indicated by plus signs and minus signs, for connection to the non-inverting input and the inverting input, respectively, of amplifier 48. For the sake of clarity, sensing element 46 is assumed hereinbelow to include resistive element 46a.

Operation is as follows. When pull-down transistor 42 is turned on, indicating a transmission, amplifier 48 senses a voltage across resistive element 46 having a predetermined polarity. This polarity is opposite to the one generated when a signal is received. Amplifier 48 provides an output signal to the buffer that distinguishes between a pulling-low by station 10 and other events in order to properly activate current source 50 of the buffer. In the example shown, upon a pulling-low by transistor 42, the non-inverting input of amplifier 48 receives a higher voltage than its inverting input. Amplifier 48 then generates a high output voltage to turn on current source 50. Thus, current source 50 operates substantially synchronously with transistor 42. In all other events, amplifier 48 maintains current source 50 turned off, thereby keeping adapting means 26 substantially transparent to incoming signals. Note that only the differential mode amplification by amplifier 48 is relevant to the operation. Please note that the transmission's noise immunity is increased owing to the use of such an adapting means.

First Embodiment of Adapting Means

The basic concept of FIG. 3 needs some elaboration. Firstly, current source 50 has to be implemented, preferably, as a quick-reacting device. Secondly, pull-up resistor 22 forms an inverter together with current source 50 that is arranged in the positive feedback path of amplifier 48. This configuration may act undesirably as an oscillator. Phase-shifting means have to be introduced to avoid oscillations in the frequency range of the transmission. Thirdly, in order to provide a fast circuit, amplifier 48 has to be kept in its linear range where its input-output voltage characteristic is the steepest.

Figure 4:
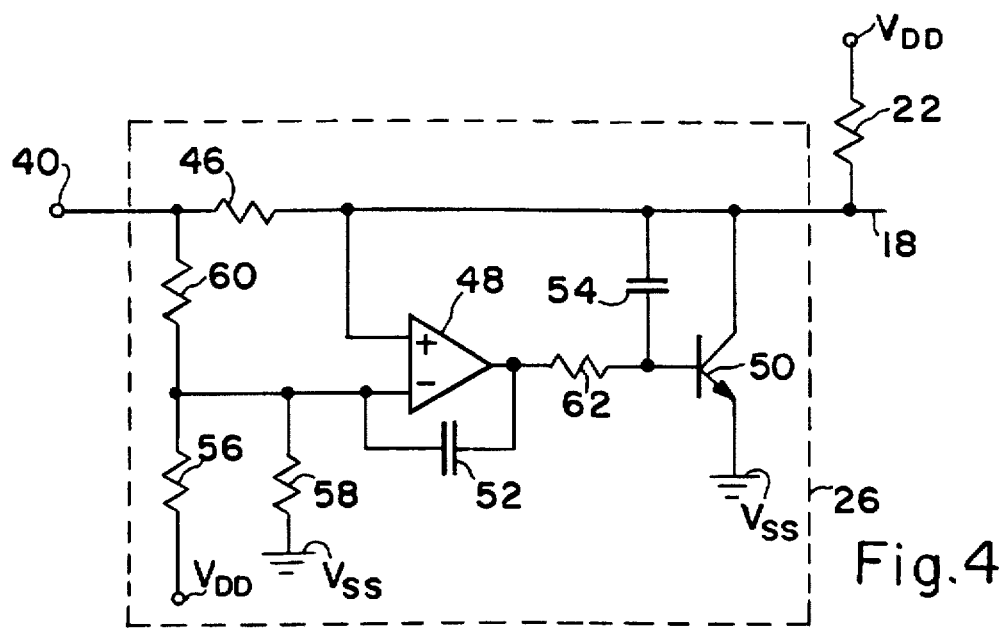
FIG. 4 shows a first embodiment of the adapting means.

In FIG. 4, an embodiment of adapting means 26 is shown that complies with the above requirements. Current source 50 now is constituted by bipolar transistor 50. As is well known, a bipolar transistor has an exponential current-voltage characteristic and therefore can function as a fast-reacting current source. The phase-shifting means comprises a capacitor 52, coupling the output of amplifier 48 to the inverting input of amplifier 48, and a capacitor 54 coupling the base electrode of transistor 50 to wire 18. In order to keep amplifier 48 and transistor 50 out of their respective saturation ranges, a resistor 60 is connected between terminal 40 and the inverting input of amplifier 48. Resistors 56 and 58 act as a voltage divider and hold the inverting input at a predetermined voltage below $V_{ss}$ when the wire is inactive, thus giving amplifier 48 an offset. A resistor 62 is introduced between the output of amplifier 48 and the base of transistor 50 to limit the current into the base.

In a typical embodiment, where the difference between $V_{DD}$ and $V_{ss}$ is about 5 volts, the above passive components preferably have the following typical values. Sensing resistor 46 is approximately 200 ohms. Capacitors 52 and 54 are approximately 220 pF and 22 pF, respectively. Resistors 56, 58 and 60 are approximately 4.7 kohms, 47 kohms and 470 ohms, respectively. Resistor 62 is approximately 2.2 kohms.

Second Embodiment Of Adapting Means

The circuits of FIGS. 3 or 4 can be considered as impedance matching circuits for one direction. Its field of application extends beyond the communication systems discussed with reference to FIGS. 1 and 2, which were only given by way of example.

Figure 5:
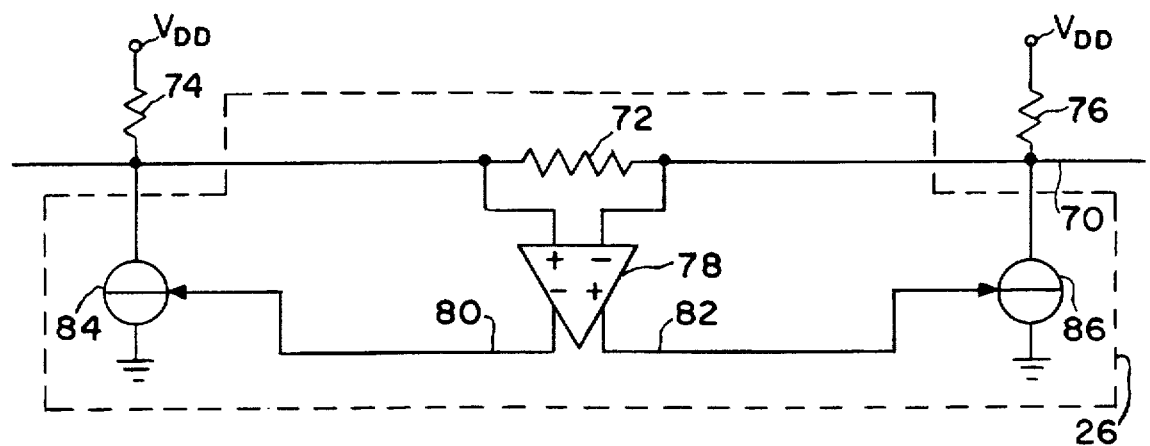
FIG. 5 shows a second embodiment of the adapting means.

FIG. 5 shows the principle of a configuration for actively controlling the signal coupling in both directions. A communication bus 70 couples two circuits (not shown) each of which is capable of transmitting and receiving a signal on the bus 70. A sensing resistor 72 is inserted into the bus. Resistors 74 and 76 represent the pull-up resistors. A differential amplifier 78 has outputs 80 and 82 supplying mutually complementary control signals to respective first and second buffers including current sources 84 and 86, respectively. One of the current sources 84 and 86 will be turned on, dependent on the propagation direction of the signal along wire 70. The other current source 86 or 84 stays inoperative. The current sources 86, 84 function as third and fourth pull-down elements.

Experiments indicate that such a configuration reduces the effects of ground voltage shifts that occur when a current in the supply line causes voltage drops owing to the internal resistance of the ground voltage supply line. Also, this configuration may be used to couple two physically different low-impedance sections of a transmission channel, such as a coax cable and a twisted line pair.

Third Embodiment of the Adapting Means

Figure 6:
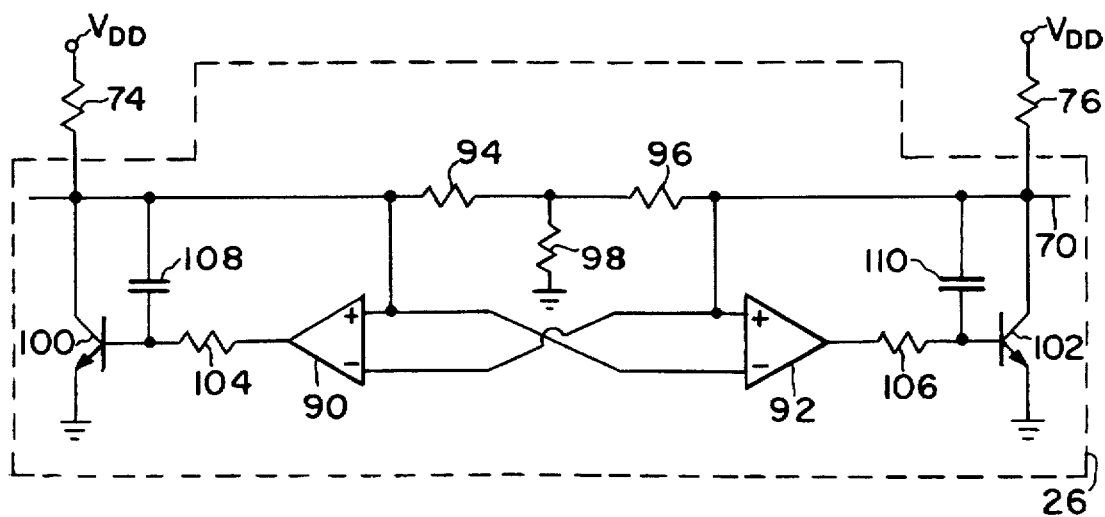
FIG. 6 shows a third embodiment of the adapting means.

FIG. 6 shows an implementation of the scheme in FIG. 5. Amplifier 78 is implemented by the arrangement of amplifier circuits 90 and 92, each having an inverting input coupled to a non-inverting input of the other amplifier circuit. Sensing resistor 72 of FIG. 5 now comprises a series arrangement of resistors 94 and 96. A third resistor 98 connects a node between resistors 94 and 96 to ground. Pull-up resistor 74 and resistor 94 form a voltage divider with resistor 98 that is connected to the inverting input of amplifier 92. Its function has been discussed with reference to FIG. 4. In this way, the voltage divider partially merges with components already available. Similarly, pull-up resistor 76 and resistors 96 and 98 form another voltage divider that is connected to the inverting input of amplifier 90.

Current sources 84 and 86 comprise bipolar transistors 100 and 102, respectively, which function as third and fourth pull-down elements. Resistors 104 and 106 limit the current flowing into transistors 100 and 102, respectively. Capacitors 108 and 110 perform phase-shifting for keeping oscillations out of the particular frequency range associated with the signal transmission.

We claim:

1. A bi-directional signal transmission system comprising: a bi-directional signal path for coupling a binary signal in a first direction from a high-impedance section of the signal path to a low-impedance section thereof and in a second direction from the low-impedance section to the high-impedance section, and adapting means for modifying the binary signal coupling between the sections under control of the binary signal only when the binary signal is transmitted in the first direction, the adapting means comprising a detector for detecting the direction of signal transmission, and a buffer controllable by the detector and having a buffer output coupled to the bi-directional signal path so that, upon detection of the first direction of signal transmission by the detector, the buffer is operated substantially synchronously with the binary signal, and the detector comprising a sensing element electrically coupled between the sections, and a sensor for sensing the polarity of a current through the sensing element indicative of the first direction of transmission thereby to derive a control signal to control the buffer, the signal transmission system further comprising a second buffer wherein the buffers are coupled to opposite ends of the sensing element and are alternately activatable by the sensor dependent on the sensed polarity of the current, wherein the sensor comprises first and second differential amplifier circuits, each amplifier circuit having a respective output coupled to a respective one of said first and second buffers for mutually complementary control of the buffers dependent on the sensed current polarity, and each amplifier circuit has an inverting input and has a non-inverting input coupled to the inverting input of the other amplifier circuit, and wherein a second sensing element is connected in series with the first sensing element between the inverting input and the non-inverting input of each circuit, a common node between the first and second sensing elements being coupled to a reference voltage node through a further impedance.

2. A bi-directional signal transmission system comprising:
a signal path interconnecting first and second stations for transmission of electric signals between the stations;
a pull-up resistor coupling the signal path to a supply voltage node;
a differential amplifier having an inverting input, a non-inverting input, and an output;
a sensing element included in the signal path so as to interconnect the first and second stations and coupled between the inverting input and the non-inverting input of the differential amplifier, said electric signals being operative to develop a voltage across the sensing element having a polarity dependent upon the direction of signal transmission along the signal path;
a controllable current source connected to the signal path and operative to discharge the signal path under control of the differential amplifier output and forming an inverter with the pull-up resistor; and
a second controllable current source connected to the signal path so that the sensing element is coupled between said controllable current sources, wherein the differential amplifier comprises a second output connected to the second controllable current source and operative to control the second controllable current source in a complementary manner to the first current source, and the first and second controllable current sources each comprise a transistor of an NPN bipolar type or of an NFET type having its conduction channel coupled between the signal path and a second supply voltage node.

3. A bi-directional signal transmission system comprising:
a signal path interconnecting first and second stations for transmission of electric signals between the stations;
a pull-up resistor coupling the signal path to a supply voltage node;
a differential amplifier having an inverting input, a non-inverting input, and an output;
a sensing element included in the signal path so as to interconnect the first and second stations and coupled between the inverting input and the non-inverting input of the differential amplifier, said electric signals being operative to develop a voltage across the sensing element having a polarity dependent upon the direction of signal transmission along the signal path;

a controllable current source connected to the signal path and operative to discharge the signal path under control of the differential amplifier output and forming an inverter with the pull-up resistor;

a second sensing element connected in a series arrangement with the first sensing element;

a second controllable current source connected to the signal path so that the series arrangement is coupled between said controllable current sources;

a second differential amplifier having a non-inverting input connected to the inverting input of the first differential amplifier, an inverting input connected to the non-inverting input of the first differential amplifier, and an output connected to the second controllable current source, and wherein the second sensing element is coupled between the inputs of the second differential amplifier.

4. A bi-directional signal transmission system comprising:

a signal path interconnecting first and second stations for transmission of electric signals between the stations;

a pull-up resistor coupling the signal path to a supply voltage node;

a differential amplifier having an inverting input, a non-inverting input, and an output;

a sensing element included in the signal path so as to interconnect the first and second stations and coupled between the inverting input and the non-inverting input of the differential amplifier, said electric signals being operative to develop a voltage across the sensing element having a polarity dependent upon the direction of signal transmission along the signal path;

a controllable current source connected to the signal path and operative to discharge the signal path under control of the differential amplifier output and forming an inverter with the pull-up resistor; and biasing means for keeping the differential amplifier substantially in its linear amplification range, and comprising:

offset means to provide a voltage offset to the non-inverting input; and a resistor connected between the sensing element and the non-inverting input.

5. An adapting means for use in a signal path for transmission of a signal between first and second stations in a bi-directional signal transmission system, wherein the signal path is coupled to a supply voltage node via a pull-up resistor, the adapting means comprising:

a sensing element for connection in the signal path to couple the stations so that said signal is operative to produce a voltage across the sensing element, the voltage having a polarity depending on a direction of signal transmission along the signal path;

a differential amplifier having an inverting input, a non-inverting input and an output, the sensing element being coupled between the inputs;

a controllable current source for connection to the signal path and operative to discharge the signal path under control of the output of the differential amplifier and for forming an inverter with the pull-up resistor; and a second controllable current source for connection to the signal path so that the sensing element is coupled between said controllable current sources, the differential amplifier comprising a second output connected to the second controllable current source and operative to control the second controllable current source in a complementary manner to the first current source.

6. An adapting means for use in a signal path for transmission of a signal between first and second stations in a bi-directional signal transmission system, wherein the signal path is coupled to a supply voltage node via a pull-up resistor, the adapting means comprising:

a sensing element for connection in the signal path to couple the stations so that said signal is operative to produce a voltage across the sensing element, the voltage having a polarity depending on a direction of signal transmission along the signal path;

a differential amplifier having an inverting input, a non-inverting input and an output, the sensing element being coupled between the inputs;

a controllable current source for connection to the signal path and operative to discharge the signal path under control of the output of the differential amplifier and for forming an inverter with the pull-up resistor;

a second sensing element connected in a series arrangement with the first sensing element;

a second controllable current source for connection to the signal path so that the series arrangement is coupled between said controllable current sources; and a second differential amplifier having a non-inverting input connected to the inverting input of the first differential amplifier, an inverting input connected to the non-inverting input of the first differential amplifier, and an output connected to the second controllable current source, the second sensing element being coupled between the inputs of the second differential amplifier.

* * * * *